US006594348B1

United States Patent
Bjurstrom et al.

(10) Patent No.: US 6,594,348 B1
(45) Date of Patent: Jul. 15, 2003

(54) VOICE BROWSER AND A METHOD AT A VOICE BROWSER

(75) Inventors: Hans Bjurstrom, Lidingo (SE); Christer Granberg, Stockholm (SE); Jesper Hogberg, Lidingo (SE); Berndt Johannsen, Taby (SE); Scott Mcglashan, Kista (SE)

(73) Assignee: Pipebeach AB, Stockholm (SE)

( * ) Notice: Subject to any disclaimer, the term of this patent is extended or adjusted under 35 U.S.C. 154(b) by 0 days.

(21) Appl. No.: 09/914,234

(22) PCT Filed: Feb. 22, 2000

(86) PCT No.: PCT/SE00/00319
§ 371 (c)(1),
(2), (4) Date: Aug. 24, 2001

(87) PCT Pub. No.: WO00/50984
PCT Pub. Date: Aug. 31, 2000

(30) Foreign Application Priority Data

Feb. 24, 1999 (SE) .............................................. 9900652

(51) Int. Cl.[7] .......................... H04M 11/00; G06F 15/16
(52) U.S. Cl. ................................ 379/88.13; 379/93.27; 709/246
(58) Field of Search ............................ 379/67.1, 93.27, 379/88.13, 265.09; 715/513; 709/246; 704/270

(56) References Cited

U.S. PATENT DOCUMENTS

| 5,761,280 | A | | 6/1998 | Noonen et al. |
| 5,884,262 | A | | 3/1999 | Wise et al. |
| 5,953,392 | A | * | 9/1999 | Rhie et al. ................ 379/88.13 |
| 6,230,173 | B1 | * | 5/2001 | Ferrel et al. ................. 715/513 |
| 6,430,624 | B1 | * | 8/2002 | Jamtgaard et al. .......... 709/246 |

FOREIGN PATENT DOCUMENTS

| EP | A20847179 | 6/1998 |
| GB | A2317070 | 3/1998 |
| WO | A19732427 | 9/1997 |

* cited by examiner

Primary Examiner—Kimberly A. Williams
Assistant Examiner—MD S. Elahee
(74) Attorney, Agent, or Firm—Birch, Stewart, Kolasch & Birch, LLP

(57) ABSTRACT

The present invention relates to a voice browser 110 and a method at a voice browser, the voice browser 110 being arranged at a server 120 connected to the Internet 130 and responsive to Dual Tone MultiFrequency (DTMF) tones received from a telecommunications network 150. The voice browser is responsive to different sets of predetermined DTMF tones, one set dedicated for voice browser functions and another set dedicated for HTML application functions. The voice browser 110 synchronises the possible DTMF tones that can be accepted for a certain browsed part of an HTML page.

26 Claims, 3 Drawing Sheets

VOICE BROWSER AND A METHOD AT A VOICE BROWSER

This application is the national phase under 35 U.S.C. § 371 of PCT International Application No. PCT/SE00/00319 which has an International filing date of Feb. 22, 2000, which designated the United States of America and was published in English.

TECHNICAL FIELD OF THE INVENTION

The present invention relates to a voice browser and a method for interpreting and responding to Dual Tone MultiFrequency (DTMF) tones received from a telecommunications network, which DTMF tones are transmitted by a user for controlling the operation of the voice browser when information published on a data packet switched network, such as the Internet, is accessed.

BACKGROUND OF THE INVENTION

The World Wide Web (WWW or Web for short) is today the most utilised Internet application. The Web consists of millions of Web pages and the number of accessible Web pages is continuously growing. An Internet user accesses a Web page using a browser. A conventional browser provides a textual and graphical user interface, which aids the user in requesting and displaying information from the Web. A conventional browser is typically a software program running on a computer, for example a personal computer. Thus, a user needs some sort of computer hardware on which browser software can be executed in order to retrieve and display information published as Web pages.

More and more companies use the Web as an information channel to their customers and/or as a way to provide services to their customers. Such companies are, for example, consumer product companies, insurance companies, banks, employment agencies etc., but also public authorities, which publish information and services relating to shopping, news, employment, education, and so on. A problem with all these web pages provided by different companies and authorities is that they are only accessible by people having a computer on which a graphical browser can be executed. Even if a user has access to a computer he needs to be connected to the Internet. In addition, people with poor reading skills or with vision problems will have difficulties in reading text-based Web pages.

For the above reasons, the research community has developed browsers for non-visual access to Web pages, or WWW content, for users that wish to access the information or services through a telephone. The non-visual browsers, or voice browsers, present audio output to a user by conversion of text of Web pages, such as HTML pages, to speech and by playing pre-recorded Web audio files from the Web. A voice browser furthermore implements the functionality needed to allow a user to navigate between Web pages, i.e. follow hyptertext links, as well as navigate within Web pages, i.e. to step backward and forward within the page. Other functions that can be provided to the user is the possibility to pause and resume the audio output, go to a start page and choose from a number of pre-defined bookmarks or favourites. Some voice browsers are implemented on PCs or Work-stations and allow the user to access the browser functions using commands inserted with a computer keyboard, while others are accessed using a telephone. When accessing a voice browser with a telephone, one or several browser commands can be sent by the user by way of using DTMF signals, which are generated with one or several keystrokes on a keypad of the telephone.

Another way to allow a user of a telephone access to a database or the like is to provide an Interactive Voice Response (IVR) system. Conventional IVR systems usually allow a user to interact directly with the application by way of transmitting DTMF signals to the system and the application. For example, the most common way of enabling a user to select between a number of choices in an IVR system is to have a menu read to the user and to allow the user to select a certain item from the menu by producing a corresponding DTMF signal. In a similar way, for certain applications that are accessed on the Internet using a voice browser, there is a need for the application to be able to receive commands directly from a user without any interference from the browser. Such direct access to keys on a keyboard sometimes in the literature referred to as "access keys". With the notation of an access key in HTML, an application could assign a key to be directly attached to the application. The action to be performed in response to a signal from such a key would then be defined by the application.

Thus, conventional techniques either use DTMF tones for controlling the browser functionality only, which is the case for known voice browsers, or for application control only, which is the case for known IVR systems. There is a problem in how to design a voice browser which in an efficient manner can simultaneously handle DTMF tones relating to browser functionality control as well as tones relating to the control of a current accessed application, especially since the number of keys of a telephone keypad generally is limited to 12 keys.

Another problem with voice browser systems is how to design a voice browser in which a currently accessed part of an HTML page is in synchronism with a set of current and relevant operations, or voice browser functions, that are possible to perform in response to received and interpreted DTMF tones.

SUMMARY OF THE INVENTION

An object of the present invention is to provide a solution for how a voice browser which is controlled through a DTMF tone interface can provide access to commands for controlling the voice browser as well as, at the same time, commands for controlling an application being separate from the voice browser and accessed from the voice browser through a data packet switched network.

Another object of the invention is to provide a voice browser system with a user friendly interface that enables a user to access the most important functions supported by the voice browser and by an application being accessed by the voice browser using only one key stroke.

Yet another object of the invention is to provide a voice browser having a mechanism that ensures that the process of accessing a certain part of an HTML page is in synchronism with a corresponding set of potential operations, or voice browser functions, that are possible to perform, for the particular HTML page part, in response to received and interpreted DTMF tones.

According to the present invention, these objects are achieved by an arrangement and a method having the features as defined in the appended claims.

According to a first aspect of the invention, there is provided a voice browser in a voice browser system, said voice browser being arranged at a server connected to the Internet and responsive to Dual Tone Multi-Frequency (DTMF) tones received from a telecommunications network, wherein said voice browser includes: an object model comprising elements defined in a retrieved HTML page and defining navigation positions within said HTML page; audio means for playing an audio stream derived from an element of said HTML page; a voice browser controller for controlling the operation of said voice browser; and a dialogue state structure, having a plurality of states and transitions between states, storing text and audio objects to be outputted to said audio means; and a dialogue controller arranged to control a dialogue with a user based on said dialogue state structure and to response to an interpreted DTMF tone with an event to said voice browser controller, wherein said voice browser controller, in response to an event including an interpreted DTMF tone of a first predetermined set of interpreted DTMF tones, is arranged to control a voice browser function associated with said interpreted DTMF tone and to control from which state in said dialogue state structure, or in a second dialogue state structure associated with a second retrieved HTML page, and dialogue should resume after an execution of said function; said voice browser controller, in response to an event including an interpreted DTMF tone of a second predetermined set of interpreted DTMF tones, is arranged to direct said interpreted DTMF tone to an application of said retrieved HTML page; each of said states is associated with a corresponding position in said object mode; and said voice browser further includes synchronisation means for synchronising said dialogue, with respect to a current state, with a position in said object model.

According to a second aspect of the invention, there is provided a method at a voice browser in a voice browser system, said voice browser being arranged at a server connected to the Internet and responsive to Dual Tone MultiFrequency (DTMF) tones received from a telecommunications network, said method comprising the steps of: retrieving an HTML page in response to a DTMF tone interpretation; creating an object model comprising the elements defined in said HTML page; deriving a number of states, each of said states including a reference to a position in said object model and at least one input and/or at least one output; creating a dialogue state structure associated with said object model in which structure each state from said deriving step is incorporated; executing a dialogue with a user based on said dialogue state structure; responding to an interpreted DTMF tone received in a state in said dialogue state structure with an event to a voice browser controller; controlling, at said voice browser controller in response to said event, if the event includes an interpreted DTMF tone of a first predetermined set of interpreted DTMF tones, a voice browser function associated with said interpreted DTMF tone and from which state in said dialogue state structure, or in a second dialogue state structure associated with a second retrieved HTML page, said dialogue should resume after an execution of said function; directing, from said voice browser controller in response to said event, if the event includes an interpreted DTMF tone of a second predetermined set of interpreted DTMF tones, the interpreted DTMF tone to an application of said HTML page; and synchronising said dialogue state structure, with respect to a current state, with a new position in said object model.

The voice browser according to the present invention is part of a voice browser system, which system also comprises at least one telephone connected to the voice browser via a telecommunications network. The voice browser is arranged to access information published as Hyper-Text Mark-up Language (HTML) files, i.e. as HTML pages, or as any other Mark-up Language files, on the Internet, or on any other data packet switched network. A telephone is used by an end user for controlling the functionality supported by the voice browser by means of transmitting DTMF tones over the telecommunications network during a dialogue between the user and the voice browser.

The telecommunications network is any kind of network on which a voice communication and DTMF tones can be transferred, such as fixed circuit switched network, a mobile communications network or a packet switched network. As implied by the latter case, the network could very well be the Internet in which case the voice browser is accessed using Internet telephone or by means of an Internet access via a mobile station and a General Packet Radio Service (GPRS) of a GSM network. Of course, the kind of telephone equipment used will be dependant upon the kind of telecommunications network chosen for accessing the voice browser, however, the telephone equipment needs to have a keypad and to be able to generate DTMF signals.

According to the invention, it is possible to control both the voice browser functionality and an application of an HTML page simultaneously from a telephone keypad using a first set of DTMF tones and a second set of DTMF tones, respectively. Each DTMF tone of these sets is generated by a user with a single keystroke on the keypad and interpreted as a certain key by the voice browser. The interpretation is transferred in an event from the dialogue state controller to the voice browser controller which performs the necessary operations relating to browser functionality or application control, the operations being dependent upon which DTMF interpretation that was received in the event.

Preferably, each state of the dialogue state structure includes a reference to a corresponding position, or node, in a parse tree that constitutes the object model. In a certain state, as a DTMF tone is received and interpreted, the key interpretation of the DTMF tone and the reference stored by the state in question, is transferred in an event, or call-back, to the voice browser controller. Thus, the object model will always be synchronised with the dialogue state structure, which means that the voice browser controller always will perform the operations associated with a specific key on the relevant part of the HTML page in accordance with the reference to the object model.

Similarly, certain positions, or nodes, of the object model are associated with references to states in the dialogue state structure in order to synchronise the dialogue structure with the object model. This synchronisation is preferably achieved by means of a look-up table, but could be accomplished using any kind of data-base means. A specific position of the object model has a corresponding entry in the look-up table and each entry in the look-up table stores a reference to an appropriate state in the dialogue state structure. Thus, after the voice browser controller has processed a received event, the resulting position, which could be the same or a new position depending on what operation the event triggered, will be means of the look-up table refer to a corresponding state in the dialogue structure. This referred state indicates the state in the dialogue state structure from which the dialogue with the user should be resumed. Hence, the following operation on the dialogue state structure, due to a received DTMF tone, will be synchronised with the current position in the object model and, thus, the currently browsed part of the HTML page.

Thus, the voice browser according to the invention ensures that synchronism is always maintained between the layout of the original HTML page retrieved by the browser and all the possible control functions offered to a user via a DTMF interface.

Preferably, an event transferred from the dialogue state structure to the voice browser controller also includes a time stamp derived from the standard clock function of the server in which the voice browser is executing. The voice browser controller uses this time stamp when performing certain operations relating to the navigation within an HTML page. These operations include those that control the browser functionality regarding moving back and forward in the object model created from the HTML page, and, thus, the audio output to the telecommunications network.

When referring to elements of an HTML page, or file, in the context of the present invention, this includes browsable text paragraphs included in the page, hypertext links, audio files referenced by the page, or other items that are suitable for audio output, either directly or after a text-to-speech conversion.

The above mentioned and further aspects and features of, as well as advantages with, the present invention, will be more fully understood from the following description, with reference to the accompanying drawings, of an exemplifying embodiment thereof.

BRIEF DESCRIPTION OF THE DRAWINGS

An embodiment of the present invention will now be described by way of example with reference to the accompanying drawings, in which.

DETAILED DESCRIPTION OF THE PREFERRED EMBODIMENT

Figure 1:
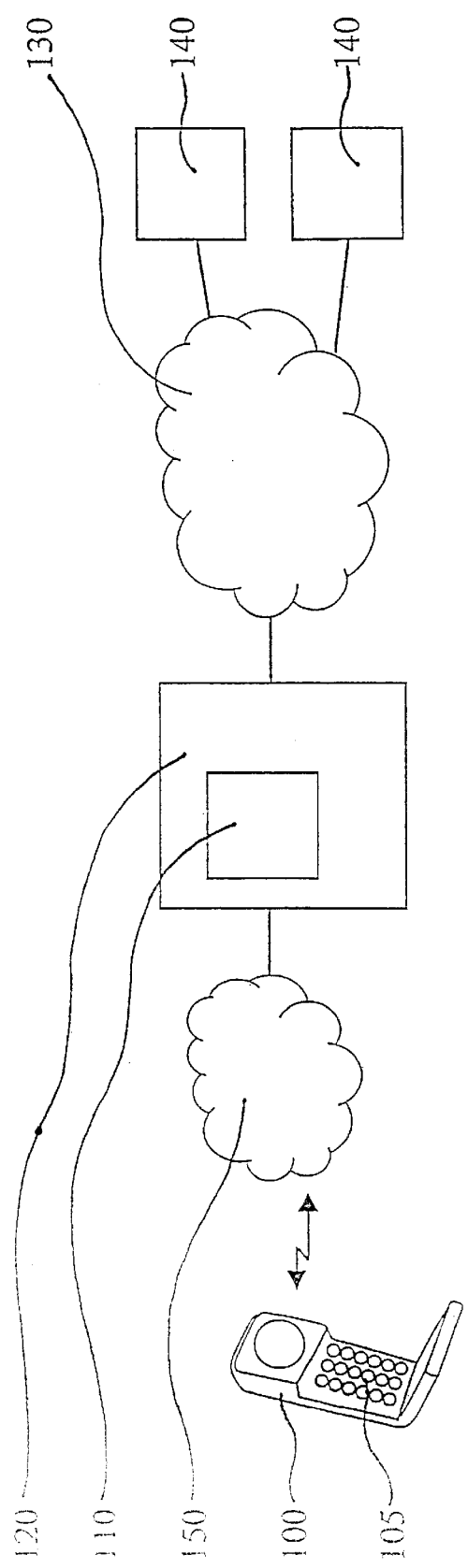
FIG. 1 shows a voice browser system with a voice browser in accordance with the present invention.

FIG. 1 provides a schematic diagram of a system for accessing World Wide Web (WWW) content, such as HTML pages, using a voice browser system. The voice browser system includes a telephone 100 and a voice browser 110 arranged at a server 120. The server 120 is connected to the Internet 130 and able to communicated using the Internet Protocol with a number of servers 140 providing WWW content on the Internet 130. The telephone 100 has keypad 105 and associated circuitry for generating Dual Tone MultiFrequency (DTMF) tones. The telephone 100 transmits DTMF tones to, and receives audio output from, the voice browser 110 via a telecommunications network 150. In FIG. 1, the telephone is exemplified with a mobile station and the telecommunications network with a mobile communications network.

The voice browser 110 transforms content of HTML pages (or pages of any other mark-up languages) to an audio output being sent to the telephone 100. The HTML pages are either retrieved from one of the servers 140 or from the server 120 itself.

Figure 2:
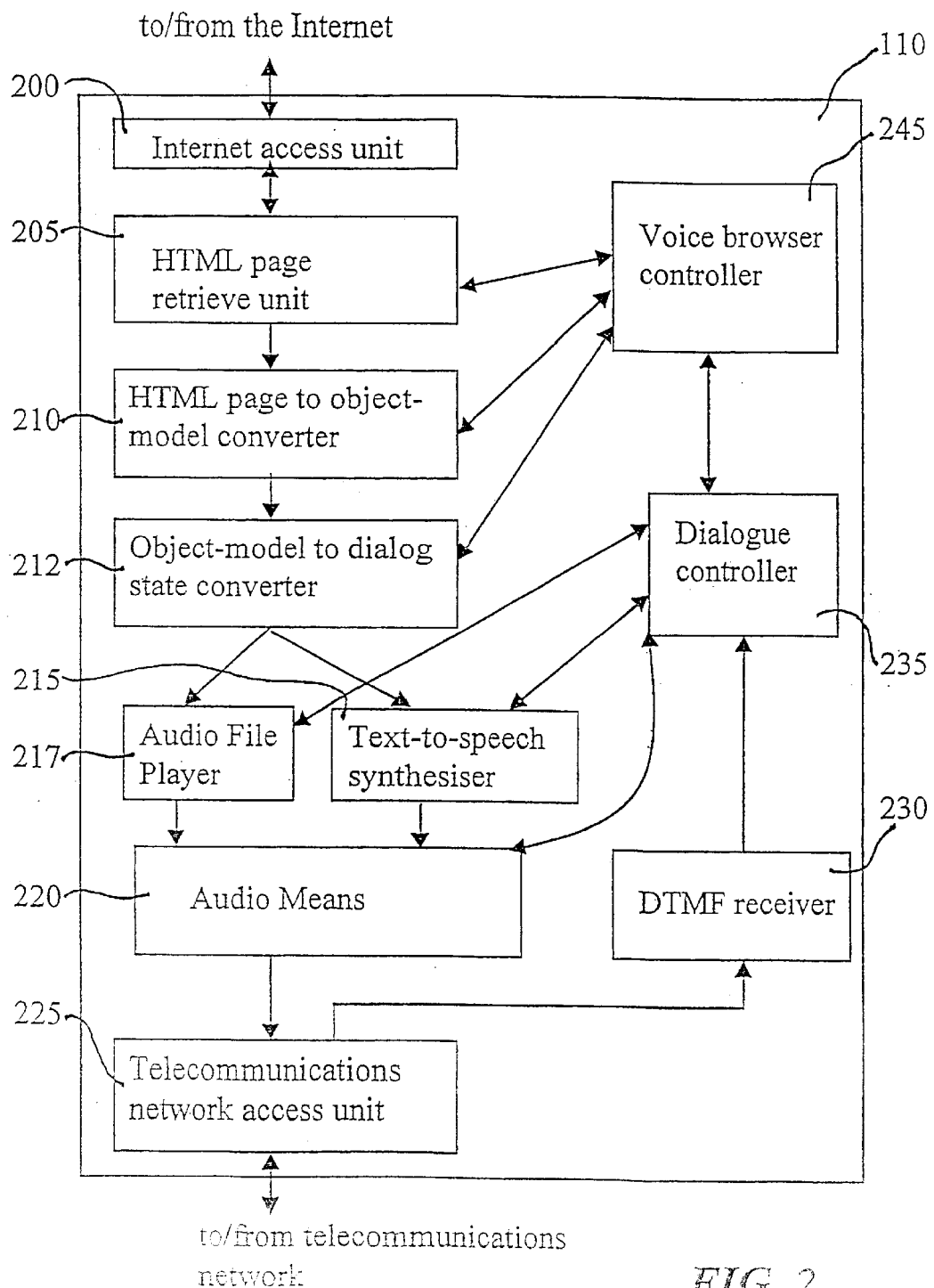
FIG. 2 shows a block diagram of a voice browser in accordance with an embodiment of the invention.

FIG. 2 shows a block diagram of the voice browser 110 referred to in FIG. 1. An Internet access unit 200 interfaces the Internet and creates a data connection to an Internet server where an HTML page to be accessed is stored. The HTML page is retrieved from the Internet using standard mechanism, such as the HTTP and TCP/IP protocols. Alternatively, an HTML page implementing a voice browser system menu is stored at, and retrieved directly from, the server 120 at which the voice browser 110 is arranged. If a user requests a personal start-up HTML page, which previously has been associated with the particular user, this start-up page is either retrieved directly from the voice browser server 120, or from another server 140 over the Internet 130.

An HTML page retrieve unit 205 controls the retrieval of HTML pages, as well as any audio files which an HTML page might have references to, which retrieval is performed by the Internet access unit 200. A retrieved page is then transferred to an HTML page-to-object model converter 210 which extracts the elements defined in the retrieved HTML page and creates an object model comprising these elements. The stored object model is then used by an object model-to-dialogue state converter 212 for creating a dialogue state structure and for deriving states to be incorporated in said dialogue state structure, the structure being associated with the particular object model.

The stored dialogue state structure and its states form the basis for the dialogue between the voice browser 110 and the end user accessing the voice browser 110 using the telephone 100. Text and audio file elements are stored in the different states of the dialogue state structure. These text and audio file elements are converted into audio streams in a text-to-speech synthesiser 215 and audio file player 217, respectively. An audio stream is transferred to an audio means 220 which is responsible for the playing of audio streams over the telecommunications network 150. The audio means 220 is responsible for adapting the audio streams into audio suitable for the telecommunications network 150. The voice browser 110 interfaces the telecommunications network 150 with a telecommunications network access unit 225, by which the audio means 220 plays the audio stream over the telecommunications network 150 to a telephone 100 of a user.

The telecommunications network access unit 225 is not only arranged to transmit audio signals to, but also to receive audio signals from, a telephone 100 of a user accessing the telecommunications network 150. These audio signals received from a user's telephone 100 are DTMF signals, which are transferred by the access unit 225 to a DTMF receiver 230. The DTMF receiver 230 is able to detect DTMF tones sent from a user's telephone 100 and to interpret these DTMF tones. An interpreted DTMF tone is then transferred from the DTMF receiver 230 to a dialogue controller 235. The dialogue controller 235 is a process arranged to operate on the dialogue state structure, which structure will be further described with reference to FIG. 3, for the purpose of generating output of text and audio towards the user and receiving DTMF tones generated by the user of a telephone 100 for the control of the voice browser functionality. Thus, the dialogue controller 235 will control the dialogue with the user and manage the output of text and audio to the user in response to DTMF tones interpretations.At the reception of an interpreted DTMF tone, the dialogue controller 235 will interact with a voice browser controller 245 by sending an event that notifies the voice browser controller 245 of the received interpreted DTMF tone. The voice browser controller 245 operates on an object model, which will be further described with reference to FIG. 3, and has internal logic for performing those steps and operations that are associated with a particular DTMF tone interpretation received in the event from the dialogue state controller 235. The dialogue controller 235 obtains a time stamp from the standard clock function and incorporates the time stamp in the event transferred to the voice browser controller 245. The voice browser controller 245 uses the received time stamp of the event in order to perform the correct and timely accurate operations relating to the navigation within the HTML page, and, thus, the audio stream played over the telecommunications network 150.

The operations performed by the voice browser controller 245 includes interaction with the HTML page retrieve unit 205, for ordering the retrieval of HTML pages, interaction with the HTML page-to-object model converter 210, for controlling the building of an object model from the elements of a retrieved HTML page, and interaction with the object model-to-dialogue state converter, for creating a dialogue state structure and its states based on the particular object model.

The operations performed by the dialogue controller 235 include interaction with the audio means 220, for example for pausing the playing of an audio stream, and interaction with the audio file player 217 and the text-to-speech synthesiser 215, for converting audio files and text, respectively, stored in the states of the dialogue state structure into audio streams playable by the audio means 220.

Figure 3:
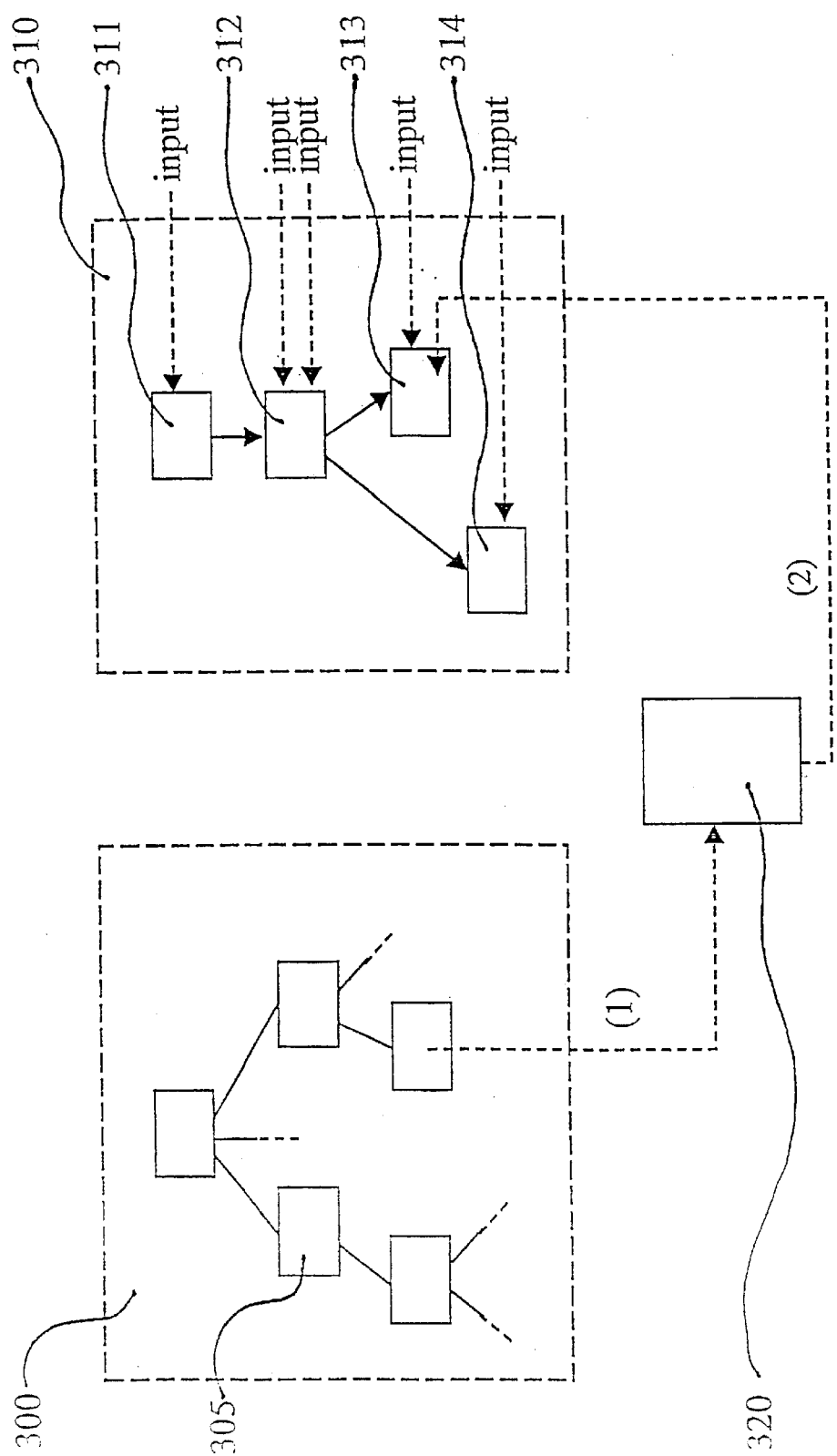
FIG. 3 schematically illustrates some internal data structures on which a voice browser operates on in accordance with the embodiment of the invention.

FIG. 3 schematically illustrates some internal data structures of the voice browser 110 in accordance with the embodiment of the invention.

In accordance with the description above, the voice browser retrieves an HTML page from the global Internet or from the server at which the voice browser is arranged to operate. The HTML page consists of a number of page elements. A page element is, for example, a text paragraph, a formatting element, a link or an input field in a form. The element can also be a 'Tabindex', i.e. a pointer in the page content defined by the HTML page designer for the purpose of being a marker for back and forward jumps within the page.

The voice browser controller 245 creates an object model 300 which includes all page elements of the retrieved HTML page. This is performed as a parsing process and the resulting object model 300 will be a parse tree structure with all page elements of the HTML page. Each node 305 in the parse tree includes a page element and represents a position in the object model 300 to which position a reference can be made by any other process of the voice browser, such as the dialogue controller. The tree structure is a one-to-one mapping of the page, or document, as described in HTML syntax.

A dialogue state structure 310 is then created by the voice browser controller 245 using the tree representation, i.e. the object model 300, of the retrieved HTML page as a basis for the construction. A dialogue element having certain properties, such as inputs, outputs and a reference to an object model position, is created for each element in the object model. These dialogue elements are grouped into states in the dialogue state structure 310 in such a way that non-compatible inputs are put into different states. The dialogue state structure 310 thus created is a finite state machine and comprises a number of states 311; 312; 313; 314; and transitions between these states. Each state includes at least one input and/or at least one output. Each state also includes a reference to a corresponding position, or node, in the object model 300.

An input of a state is a DTMF tone together with a specification of how to interpret the DTMF tone, i.e. whether to generate a voice browser control event or an application event to be sent to the voice browser controller 245. An event always contains the interpretation of the input, i.e. the interpretation of a DTMF tone. As mentioned earlier, the event also includes a time stamp. In a system which also supports speech input, the event would contain the interpretation of the speech input. However, events may be sent to the voice browser controller 245 for reasons other than a DTMF tone, or speech, interpretation, for example when the playing of a text has started or finished, when a timeout for an input has occurred or when a non-interpretable DTMF tone, or speech input, has been received. An output of a state is a text, audio file or any other audio stream description to be treated by the text-to-speech synthesiser 215 or audio file player 217.

After creation of the dialogue state structure 310, the voice browser controller 245 starts the dialogue controller 235, which is the process controlling the dialogue state structure 310. By controlling the dialogue state structure 310, the dialogue controller 235 also controls the different possibilities for a user to interact with the voice browser 110 at a particular moment, or rather, at a particular browsed part of the HTML page. This is because a state on which the dialogue controller 235 is currently operating has a limited set of possible inputs that can be mapped to voice browser functions.

When a valid DTMF tone interpretation is received in a current state, the dialogue controller 235 transfers an event to the voice browser controller 245. The event includes the DTMF tone interpretation, a reference to a unique position in the object model 300, which reference is stored by the state from which the event originated, a time stamp with the current time, and a reference to the 'next' part of the dialogue state structure so that the current dialogue can resume, if applicable, from this 'next' part. Upon receiving an event, the voice browser controller 245 extracts the DTMF tone interpretation and performs the operations that are associated with the specific interpretation.

If the DTMF tone interpretation of the event belongs to a first set of predetermined interpretations, the user input is intended to control the voice browser 110 itself and the operations performed by the voice browser 110 involves implementing a specific browser function. A browser function typically involves transferring of an element from a state of the dialogue state structure 310 to the audio means 220, or indirectly via the next-to-speech synthesiser 215, in which audio means 220 an audio stream is played for the user over the telecommunications network. Another typical browser function is to control the playing of the audio stream by the audio means 220 backwards or forwards. If the DTMF tone interpretation of the event belongs to a second set of predetermined interpretations, the user input is intended for the HTML application and the operations performed by the voice browser are determined from the action specified by the HTML application for the particular DTMF tone interpretation.

FIG. 3 also shows a look-up table 320 implementing the synchronisation means used by the voice browser 110. The look-up table 320 is used for synchronising the dialogue state structure 310 with a position in the object model 300. The following will illustrate the use of the look-up table 320. Assume that the voice browser controller 300 receives an event that triggers set of operations to accomplish a certain browser function. If, for example, the operations implements the function of jumping back on an HTML page, an element of a node having a position in the object model 300 that differs from the current position needs to be converted to audio output and transferred via the dialogue state structure 310 to the user. This is accomplished by using a reference from the current position, or current node, to the new relevant position. From this new position, a new state of the dialogue state structure 310 needs to be synchronised with the new position in the object model 300, in order to be able to output the correct text or audio element and to handle a different set of possible user inputs which is accepted at the new position. From the new position in the object model 300 a corresponding entry in the look-up table 320 is addressed, this is illustrated in FIG. 3 with arrow (1). From the entry in question, a reference to a new state is retrieved, illustrated with arrow (2), and the dialogue controller 235 is notified of the new appropriate state at which the next user input should be accepted.

For each retrieved HTML page a unique object model 300 is configured as well as a unique dialogue state structure 310 associated with the object model 300. When retrieving a new HTML page, the voice browser 110 stores the object model 300 and the dialogue structure 310 of the previous HTML page and derives a new object model and a new dialogue structure for the new HTML page. Thus, the previous HTML page is put in the history list, which enables the browser to provide a user with an option of quickly restoring a previously accessed HTML page from the history list.

As indicated above, the design of the voice browser controller 245 decides what function that should be associated with a particular interpreted DTMF tone. If a user for example presses the key '7' on his telephone keypad, a corresponding DTMF tone is transmitted to the DTMF receiver 230 of the voice browser 110 for interpretation. The DTMF tone interpretation is transferred in an event to the voice browser controller 245, which examines the interpretation and performs the operations associated with that interpretation.

According to the described embodiment, the voice browser 110 has the following command layout;

| Key | Command |
|-----|---------|
| 1 | Reserved for Access Key binding |
| 2 | Reserved for Access Key binding |
| 3 | Reserved for Access Key binding |
| 4 | Reserved for Access Key binding |
| 5 | Reserved for Access Key binding |
| 6 | Reserved for Access Key binding |
| 7 | Back |
| 8 | Pause |
| 9 | Forward |
| 0 | Go to start page |
| * | Go to system menu |
| # | Select |

The functions associated with the interpreted DTMF tones corresponding to keys 1–6 of the keypad 105 of telephone 100 in FIG. 1 are reserved for the application of a retrieved HTML page, i.e. the keys 1–6 are reserved for Access Key binding. These keys can be used by the application designer for a user interface design that is specific to the particular application. For example, in an e-mail reader application the key '6' can be bound to a link that leads to a page in which the user can request a mail to be deleted.

A key value '7' is by the voice browser controller 245 associated with operations that implement a browser back function, i.e. the browser jumps back on the currently read HTML page. This is accomplished by reverting the playing of an audio stream by the audio means 220, which can be done in two different ways: either by reverting an audio stream pointer in the audio means 220 a predefined number of seconds, with respect to the time stamp received in the event, or by reverting the audio stream pointer to the start of the current audio stream representing the currently read element.

If, in the latter case described above, another key value '7' is received in an event by the voice browser controller 245 within a certain time window, which time window is defined by the maximum allowed time between two time stamps received in two consecutive events, the current position in the object model 300 is reverted to the previous position. This is done using a reference from the current to the previous position, whereby the previous read element is converted to an audio stream and transferred once again to the user. If yet another event with the key value '7' is received within yet another time window, according to one embodiment, the current position is in a similar way reverted to yet another previous position, which process is repeated for each key value '7' until the first position in the object model, and, thus, the top of the HTML page is browsed. According to another embodiment, the first previous position will be followed by the top position. If yet another key value '7' is received in these two embodiments, the position is reverted to either the last visited position of the previously traversed object model associated with the previously read HTML page or to the top position of said previously traversed object model.

A key value '8' is by the voice browser 110, by means of the dialogue controller 245 associated with operations that implement a pause function, i.e. the playing of the audio stream by the audio means 220 is ordered to be temporarily stopped. A following key value '8' will cause the audio stream to resume. Alternatively, the playing by the audio means 220 is resumed with any audio stream resulting from the next key stroke value. This next key value can be any key value included in the table above. For example, the audio means 220 resumes with the audio stream relating to the previously read element if the next received key value is '7', if that implementation is the one chosen for key '7' as described above.

A key value '9' is by the voice browser controller 245 associated with operations that implement a browser forward function, i.e. the browser jumps forward on the currently read HTML page. This is accomplished by forwarding the playing of an audio stream by the audio means 220 by forwarding an audio stream pointer in the audio means 220 a predefined number of seconds with respect to the time stamp received in the event carrying the key value '9'. Alternatively, the current position in the object model 300 is forwarded to a next position. This is done using of a reference from the current to the next position, whereby the next element of the HTML page is converted to an audio stream and transferred to the user.

A key value '0' is by the voice browser controller 245 associated with operations that implement the retrieval of a user's predefined HTML start page. As mentioned, the start-up page is either retrieved directly from the voice browser server 120, or from another server 140 over the Internet 130. A key value '★' is by the voice browser controller 245 associated with operations that implement the retrieval of a voice browser system menu designed as an HTML page. The voice browser 110 retrieves the system menu from the server 120 at which the voice browser is arranged. The system menu includes the voice browser functions relating to bookmarks, inputting of URLs, different user preferences relating to, for example, language, as well as other functions.

A key value '#' is by the voice browser controller 245 associated with operations that implement a select function, i.e. the selection of an active element which, for example, is a currently read hypertext link or any kind of user option provided by the read HTML page.

Although the description of the invention has been made with respect to the Internet communication system, it is understood by those skilled in the art that the invention also may be used in other similar types of interconnected communications networks facilitating communication among computers connected to these networks.

Also, even though the description further has been made mainly with respect to the World Wide Web application, it is to be understood that the invention may as well be used for many other kinds of net applications and is not limited thereto.

What is claimed is:

1. A voice browser in a voice browser system, said voice browser being arranged at a server connected to the Internet and responsive to Dual Tone MultiFrequency (DTMF) tones received from a telecommunications network, wherein said voice browser includes:

an object model comprising elements defined in a retrieved HTML page and defining navigation positions within said HTML page;

audio means for playing an audio stream derived from an element of said HTML page;

a voice browser controller for controlling the operation of said voice browser; and a dialogue state structure, having a plurality of states and transitions between states, storing text and audio objects to be outputted to said audio means; and a dialogue controller arranged to control a dialogue with a user based on said dialogue state structure and to respond to an interpreted DTMF tone with an event to said voice browser controller, wherein said voice browser controller, in response to an event including an interpreted DTMF tone of a first predetermined set of interpreted DTMF tones, is arranged to control voice browser function associated with said interpreted DTMF tone and to control from which state in said dialogue state structure, or in a second dialogue state structure associated with a second retrieved HTML page, said dialogue should resume after an execution of said function;

said voice browser controller, in response to an event including an interpreted DTMF tone of a second predetermined set of interpreted DTMF tones, is arranged to direct said interpreted DTMF tone to an application of said retrieved HTML page;

each of said states is associated with a corresponding position in said object mode; and said voice browser further includes synchronisation means for synchronising said dialogue state structure, with respect to a current state, with a new position in said object model.

2. A voice browser as claimed in claim 1, wherein each state of said dialogue structure is arranged to hold a reference to a corresponding position in said object model.

3. A voice browser as claimed in claim 1 or 2, wherein said synchronisation means includes a look-up table which for specific positions in said object model is arranged to hold a reference to a corresponding state in said dialogue state structure.

4. A voice browser as claimed in claim 1, wherein each retrieved HTML page is associated with a corresponding object model, which object model is associated with a corresponding dialogue state structure.

5. A voice browser as claimed in claim 1, wherein said server stores at least one voice browser specific HTML page and wherein said retrieved HTML page is either an HTML page retrieved from the Internet or said voice browser specific HTML page retrieved from said server.

6. A voice browser as claimed in claim 5, wherein said voice browser specific HTML page is retrieved by said voice browser controller in response to a first DTMF tone interpretation included in said first predetermined set.

7. A voice browser as claimed in claim 6, wherein said voice browser specific HTML page is a voice browser system menu page and wherein said first DTMF tone interpretation preferably is the key '★' of a telephone keypad.

8. A voice browser as claimed in claim 1, wherein said voice browser controller is arranged to revert the playing of said audio stream a predefined number of seconds in response to a second DTMF tone interpretation included in said first predetermined set, preferably the key '7' of a telephone keypad.

9. A voice browser as claimed in claim 1, wherein said voice browser controller is arranged to revert the playing of said audio stream to the start of the current read HTML page element in response to a second DTMF tone interpretation included in said first predetermined set, preferably the key '7' of a telephone keypad.

10. A voice browser as claimed in claim 9, wherein said voice browser controller is arranged to, in response to each additionally received second DTMF tone interpretation, received within a respective time window, revert from the current position of said object model to a previous position designating the start of the previously read HTML element, until the top position of said object model designating the start of the HTML page is reached.

11. A voice browser as claimed in claim 9, wherein said voice browser controller is arranged to, in response to an additionally received second DTMF tone interpretation, received within a certain time window, revert from the current position of said object model to a previous position designating the start of the previously read HTML element, and in response to yet another additionally received second DTMF tone interpretation, received within a certain time window, revert to the top position of said object model.

12. A voice browser as claimed in claim in any one of claims 9–11, wherein said voice browser controller is arranged to, in response to yet another received DTMF tone interpretation, received within a certain time window and identical to said second DTMF tone interpretation, revert from the current position of said object model to either the last visited position of a previously traversed object model associated with the previously read HTML page or to the top position of said previously traversed object model.

13. A voice browser as claimed in claim 1, wherein said voice browser controller is arranged to advance the playing of said audio stream a predetermined number of seconds in response to a third DTMF tone interpretation included in said first predetermined set, preferably the key '9' of a telephone keypad.

14. A voice browser as claimed in claim 1, wherein said voice browser controller is arranged to advance from the current position of said object model to a next position of the same model in response to a third DTMF tone interpretation included in said first predetermined set, preferably the key '9' of a telephone keypad.

15. A voice browser as claimed in claim 1, wherein said voice browser controller is arranged to stop the playing of said audio stream in response to a fourth DTMF tone interpretation included in said first predetermined set, preferably the key '8' of a telephone keypad, and to resume with a second audio stream, in response to a fifth DTMF tone interpretation included in either of said first or second set, which second audio stream is derived from the result of said fifth DTMF tone interpretation.

16. A voice browser as claimed in claim 1, wherein said voice browser controller is arranged to select an active element, which preferably is a link, at the current position in said object model in response to a sixth DTMF tone interpretation included in said first predetermined set, preferably the key '#' of a telephone keypad.

17. A voice browser as claimed in claim 1, wherein said retrieved HTML page is a previously configured user start-up page, which page is retrieved in response to a seventh DTMF tone interpretation included in said first predetermined set, preferably the key '0' of a telephone keypad.

18. A method at a voice browser in a voice browser system, said voice browser being arranged at a severs connected to the Internet and responsive to Dual Tone MultiFrequency (DTMF) tones received from a telecommunications network, said method comprising the steps of:

retrieving an HTML page in response to a DTMF tone interpretation;

creating an object model comprising the elements defined in said HTML page;

deriving a number of states, each of said states including a reference to a position in said object model and at least one input and/or at least one output;

creating a dialogue state structure associated with said object model in which structure each state from said deriving step is incorporated together with transitions between the states;

executing a dialogue with a user based on said dialogue state structure;

responding to an interpreted DTMF tone received in a state in said dialogue state structure with an event to a voice browser controller;

controlling, at said voice browser controller in response to said event, if the event includes an interpreted DTMF tone of a first predetermined set of interpreted DTMF tones, a voice browser function associated with said interpreted DTMF tone and from which state in said dialogue state structure, or in a second dialogue state structure associated with a second retrieved HTML page, said dialogue should resume after an execution of said function;

directing, from said voice browser controller in response to said event, if the event includes an interpreted DTMF tone of a second predetermined set of interpreted DTMF tones, the interpreted DTMF tone to an application of said HTML page; and synchronising said dialogue state structure, with respect to a current state, with a new position in said object model.

19. A method as claimed in claim 18, wherein said event including said interpreted DTMF tone of said first set further includes the reference to said position in said object model.

20. A method as claimed in claim 18 or 19, comprising the step of creating a look-up table, wherein said synchronising step comprises accessing said look-up table from said voice browser controller, after having processed said event, in order to retrieve a reference to a state in said dialogue state structure, which state corresponds to said new position being the result of the processing of said event.

21. A method as claimed in claim 18, comprising storing at least one voice browser specific HTML page at said server, wherein said step of retrieving an HTML page comprises retrieving either an HTML page from the Internet or said voice browser specific HTML page from said server.

22. A method as claimed in claim 18, wherein said first predetermined set comprises the DTMF tone interpretations '7', '8', '9', '0', '★' and '#' of a telephone keypad.

23. A method as claimed in claim 22, wherein the DTMF tone interpretation '★' controls the retrieval of a system menu HTML page stored at said a server.

24. A method as claimed in claim 22 or 23, wherein the DTMF tone interpretation '#' controls the selecting of an active element at a current position in said object model.

25. A method as claimed in claim 22, wherein the DTMF tone interpretation '0' controls the retrieval of a user's predefined HTML start page.

26. A method as claimed in claim 18, wherein said second predetermined set comprises the DTMF tone interpretations '1'–'6' of a telephone keypad.

* * * * *